Dec. 16, 1930. M. J. ADAMS 1,785,717
WAGON
Filed March 2, 1929 3 Sheets-Sheet 3
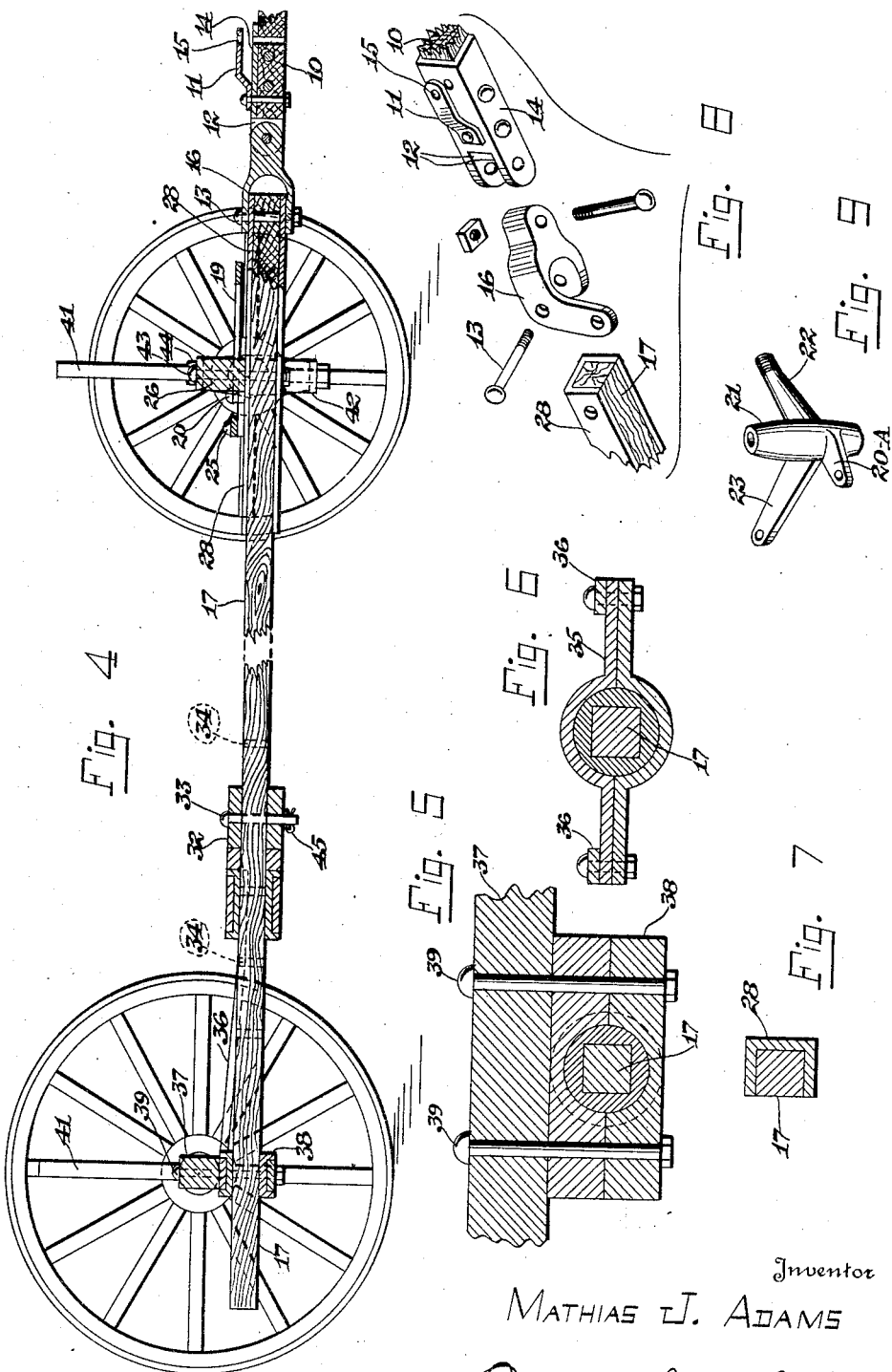
Inventor
MATHIAS J. ADAMS
By Oscar A. Michel
Attorney Patented Dec. 16, 1930

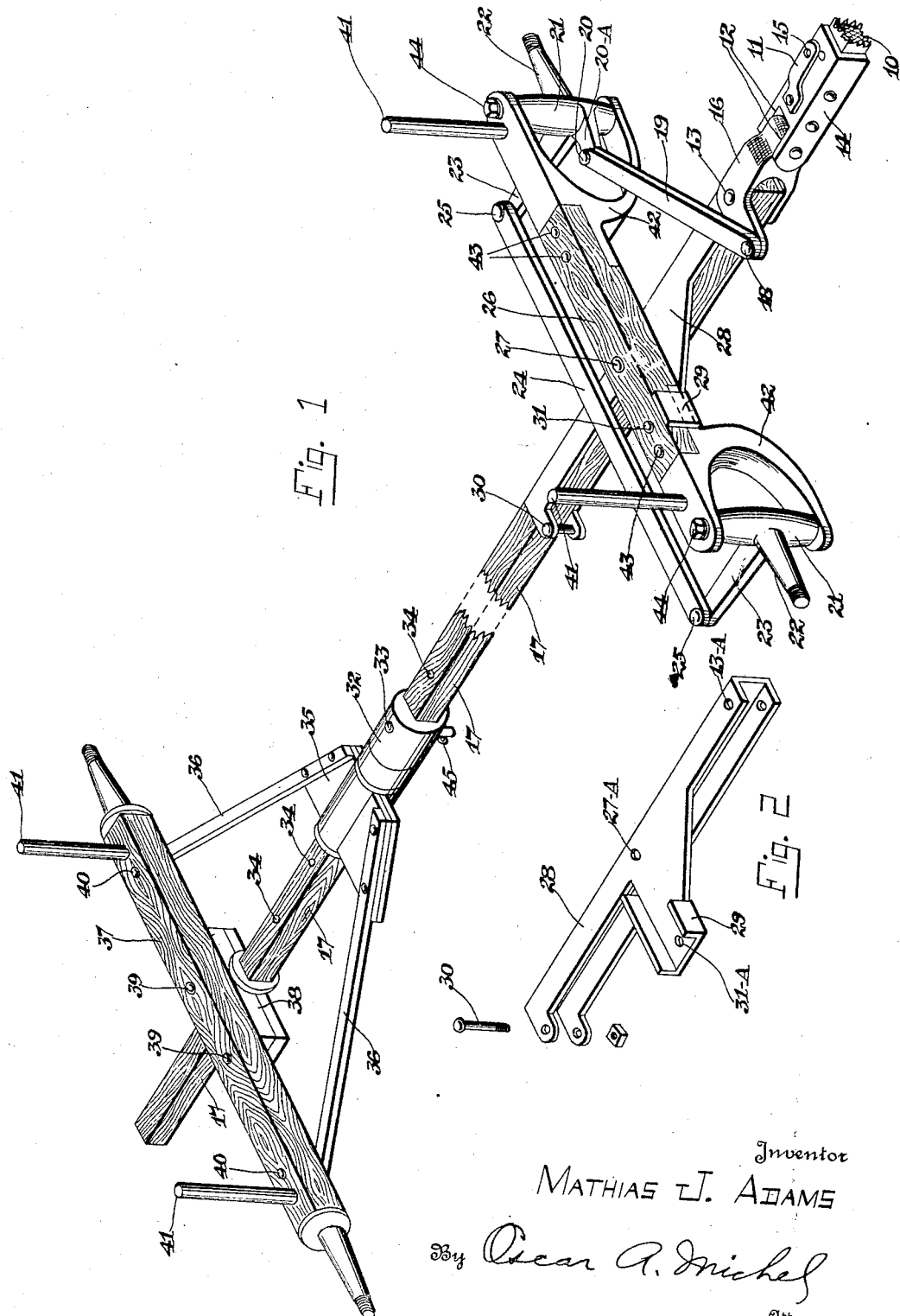

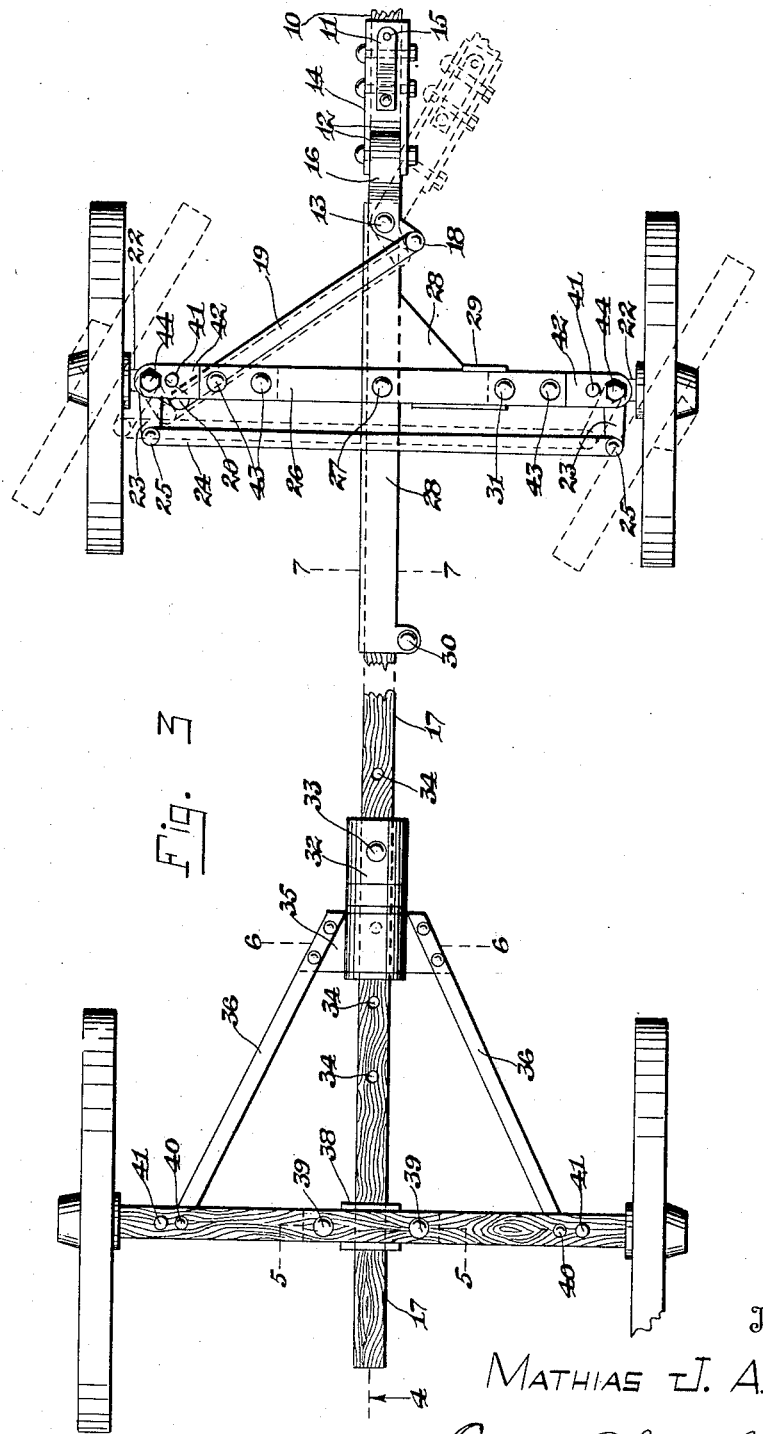

1,785,717

UNITED STATES PATENT OFFICE

MATHIAS J. ADAMS, OF TURKEY RIVER, IOWA, ASSIGNOR OF ONE-FOURTH TO ADAMS PATENT WHEEL CO., OF TURKEY RIVER, IOWA

WAGON

Application filed March 2, 1929. Serial No. 343,959.

This invention relates to improved vehicular equipment, and more especially to non-mechanically or non-powered driven wagons and trucks, and has particular reference to improved running gear connected to an improved frame on which variously constructed bodies may be mounted as on any ordinary animal drawn vehicle, to suit the requirements of the user.

The primary object of my invention is the provision in a vehicle of this character, certain and material improvements in the running gear and frame in cartage wagons and trucks having the standard wagon track, 4 feet 8 inches between wheel centers, built of high grade well seasoned material, and guaranteed to give excellent service in farm work, excavation, railroad grading, construction, mines, lumber mills, or in any service where light and heavy haulage are the demands.

A further object is the provision of a method in a vehicle of this character wherein the axles are adjustably connected by a reach rod and connected to said axles by the underslung method; or wherein the journal bearings of the said channel reach rod rest and rubs in bushings centered and fitted into bisected metal spools attached to the undersides of said axles.

A still further object is the provision in a vehicle of this character, having an adjustable channel reach rod interconnecting the front and rear axles and spool shaped heads attached to the undersides of said axles at the centers thereof, and said spool shaped heads are bisected through the diameters of their circles, making two halves to facilitate mounting and dismantling to and from said axles.

A still further object is the provision in a vehicle of this character of spool shaped heads attached to axles by the underslung method and which said spool shaped heads have squared centers with standard bushings, and wherein the journal bearings of an adjustable channel reach rod, rest and rub, thus forming frictional connections sustaining weight, lateral and pulling stresses.

A still further object in a vehicle of this character is the provision of an improved wagon where the draft pull is direct on the end of the channel reach rod instead of on the front axle by means of forked hound rods attached to tongue as in the ordinary wagon.

A still further object in a vehicle of this character is the provision of an improved wagon wherein the rear running gear and improvements can twist and bend over the undulations and irregularities of the road track without breaking or injuring any part of the wagon.

A still further object in a vehicle of this character is the provision of an improved wagon where ground clearance is greater than that found in the ordinary wagon, and still have the load lower than carried in the average wagon.

A still further object in a vehicle of this character is the provision of an improved wagon by simplifying the front running gear with the elimination of certain elements used in the ordinary or unimproved wagon. The old style wagon requires the uses of a bolster and sandbar and axle in complementing its front running gear. In my improved wagon the bolster and sandbar are eliminated, leaving but one piece, the axle, yet the strength and efficiency is not impaired, as the axle having no bolster to support obviates the necessity of threatening its strength by the drilling of a one inch hole through its center to receive a king bolt by which the bolster and sandbar are pinned and held in place as in wagons not equipped with my improvements.

A still further object in a vehicle of this character is the provision of an improved wagon by eliminating severe and dangerous side thrusts made by the wagon tongue whenever one of the front wheels collide with an obstruction in the road track. This feature is provided for by the application of the ordinary principles of leverage on a materially reduced scale. In the unimproved or old style wagon, the average distance from the kingbolt to wheel center is 28 inches, while in my improved wagon there is only 9 inches from the fulcrum rest to wheel center, therefore, rendering the leverage available practically negligible.

A still further object in a vehicle of the character described is the conjoining of the tongue and the channel reach rod by means of a specially devised hinge which permits the tongue to swing vertically, and by the use of a second hinged joint functioning at an appropriate distance ahead of the vertical joint, permits the tongue to swing laterally, the whole operating on the principle enunciated by the universal joint.

A still further object in a vehicle of the character described, is the establishment of a rigid front axle, elimination of bolster, sandbar and kingbolt, and providing for the necessary turning of front wheels by the attachment of journals to spindles which said spindles are joined to axle, the said spindles transmitting their motion to wheels from guide levers attached to wagon tongue; so as the wagon tongue swings the front wheels parallel their direction simultaneously.

A still further object in a vehicle of this character is the provision of an improved wagon or truck with novel, but required and important refinements, but simple in construction and that is easily and cheaply manufactured and assembled, and that can readily be knocked down for storage and shipping purposes.

My improvements consist in novel arrangement and combination of elements creating a new and materially improved operating unit in non-powered transportation methods as hereinafter fully, clearly and concisely set forth, definitely pointed out in my claims and illustrated by the accompanying drawings, in which, Figure 1 is a perspective view of my improved wagon frame and running gear devices, and draft gear attachment for wagons and trucks;

Figure 2 is a detached perspective view of brace for holding rigidly and reinforcing the conjoinment of channel reach rod and front axle;

Figure 3 is a top plan view showing essentially by means of dotted lines the radius of action of front wheels and the united and simultaneous action of front wheels and wagon tongue therewith;

Figure 4 is a vertical sectional view on the line 4—4 of Figure 3;

Figure 5 is a vertical sectional view on the line 5—5 of Figure 3;

Figure 6 is a vertical sectional view on the line 6—6 of Figure 3;

Figure 7 is a vertical sectional view on the line 7—7 of Figure 3;

Figure 8 is a disjointed and detailed perspective view of tongue attachments, universal joint and channel reach rod and bolts, and nuts for joining and making secure said items when assembled for operation; and Figure 9 is a detailed perspective view of the axle spindle with levers and journal attachments.

Referring to drawings in detail in which reference characters and numerals refer to like parts throughout; and, especially, to Figure 1 which is a perspective view of my improved frame and running gear attachments for wagons and trucks, and in which the complete structure is shown. Wagon tongue 10 is attached to sleeve 14 and is positively attached thereto by bolt inserted through hole 15 of hammerstrap 11 and hole 15 of sleeve 14 which is connected to swivel 16 at joint 12, which arrangements admit of tongue 10 and sleeve 14 swinging vertically. Swivel 16 is joined to channel reach rod 17 by bolt 13 which forms joint admitting of swivel 16 swinging laterally in a horizontal plane.

Referring again specifically to drawing of Figure 1, the radial turning of front wheels is effected by the transmission of the lateral motion of swivel 16 hinged at bolt 18 to guide rod 19 hinged at bolt 20 to spindle 21 to which is attached journal 22 to which wheel is hubbed. Connecting rod 24 hinged at both ends by bolts 25 to levers 23 attached to spindles 21 unites and interconnects the unisoned radial motions in the road track of both front wheels which (though not shown in drawing of Figure 1) are hubbed on journals 22.

Referring again specifically to drawing of Figure 1, spindles 21 are attached and hinged on axle jaws 42 by cap nutted bolts 44; axle jaws 42 are fastened to axle 26 by bolts 43, 43 and 31. Axle 26 is joined to reach rod 17 by bolt 27 which said bolt 27 penetrates said axle 26 and brace 28 and said reach rod 17 and is fastened and held in place by nut not shown in drawing.

Referring again specifically to drawing of Figure 1, brace 28 is rigidly attached to channel reach rod 17 by bolts 27 and 30, and bracketed to said brace 28 and forming a dependent part thereof is U-shaped cup 29 to which axle 26 is rigidly morticed by the functioning of said U-shaped cup 29 and which said morticed attachment is reinforced by bolt 31.

Referring again specifically to drawing of Figure 1, cylindrical shaped coupler 32 to which is welded angular shaped crosspiece 35 and to which are attached hound rods 36, which said hound rods 36 are attached to rear axle 37 by bolts 40. Rear axle 37 is attached to reach rod 17 by slip head 38 which is underslung and attached to rear axle 37 by bolts 39. Slip head 38 having a squared center hole through which channel reach rod 17 passes and snugly fits, even as said channel reach rod 17 passes through and snugly fits the squared center hole of coupler 32. The entire rear running gear as described can as a unit be moved backward or forward and given a fixed position in relation to the front running gear. Pin holes 34 are spaced relationally in reach rod 17, and in which coupling pin 33 is inserted giving the rear running gear a positive fixation to reach rod 17 at any one of the selected holes 34. Coupling pin 33 is held in place by cotter key 45. Thus can be effected the lengthening or shortening of the wagon or truck so equipped and as described.

Referring again specifically to drawing Figure 1, corner posts 41 are irremovably attached to front and rear axles respectively for the purposes of holding in place cargo or wagon body.

Referring now specifically to drawing of Figure 2, is a detailed perspective view of brace 28 with means variously arranged for attaching to and strengthening reach rod 17 and bracketed U-shaped cup 29 for gripping and holding front axle 26. Also shown in drawing Figure 2 are holes 13a for receiving bolt 13 for joining swivel 16 to and brace 28 to reach rod 17; also shown is hole 27a for receiving bolt 27 which joins axle 26, brace 28 and reach rod 17 together; also shown detached bolt 30 and holes 30a for inserting same and nut for fastening said bolt 30.

For shipping and storage purposes or related purposes, the entire equipment is transported in dismantled condition, but in such arrangement that the entire wagon as fully described in detail can be quickly assembled, mounted and placed in operation without undue delay.

Though the embodiments of the invention, preferred and normal, have been described in detail, it is obvious that modification may be made without intentionally or actually departing from the spirit or scope of my invention.

It is the intention to cover all such modifications that fall within the scope and spirit of my invention and the features thereof as defined by the ensuing and appended claims.

What I claim as new is:

1. In a wagon running gear including front and rear axles and a tongue, a reach bar connecting said axles, a U-shaped reinforcing member embracing said reach bar and clamped thereto, one side of said U-shaped reinforcing member having a U-shaped keeper for the reception of the front axle, and means securing said front axle to said U-shaped reinforcing member against shifting.

2. In a wagon running gear including front and rear axles and a tongue, a reach bar connecting said axles, a U-shaped reinforcing member embracing said reach bar and clamped thereto, one side of said U-shaped reinforcing member having a U-shaped keeper for the reception of the front axle, means securing said front axle to said U-shaped reinforcing member against shifting, wheels spindled at the ends of said front axle, and tongue controlled steering means for said wheels carried by said U-shaped reinforcing member.

3. In a wagon running gear including front and rear axles and a tongue, a reach bar connecting said axles, a U-shaped reinforcing member embracing said reach bar and clamped thereto, means associated with said U-shaped reinforcing means and independent of said reach bar for anchoring said front axle thereto, wheels spindled at the ends of said front axle, and tongue controlled steering means for said wheels carried by said U-shaped reinforcing member.

4. In a wagon running gear including front and rear axles and a tongue, a reach bar connecting said axles, a U-shaped reinforcing member embracing said reach bar and clamped thereto, one side of said U-shaped reinforcing member having an upstanding U-shaped keeper for the reception of the front axle, and means securing said front axle to said U-shaped reinforcing member against shifting.

5. In a wagon running gear including front and rear axles and a tongue, a reach bar connecting said axles, a U-shaped reinforcing member embracing said reach bar and clamped thereto, one side of said U-shaped reinforcing member having a U-shaped keeper for the reception of the front axle, means securing said front axle to said U-shaped reinforcing member against shifting, wheels spindled at the ends of said front axle, a horizontally swingable spindle control member carried at the end of said U-shaped member and embracing the same, said control member having a forward horizontal bearing, and a draft tongue carried in said bearing.

In testimony whereof I hereunto affix my signature.

MATHIAS J. ADAMS.